United States Patent
Zhang et al.

(10) Patent No.: US 12,038,918 B1
(45) Date of Patent: Jul. 16, 2024

(54) DISAMBIGUITY IN LARGE LANGUAGE MODELS

(71) Applicant: Intuit Inc., Mountain View, CA (US)

(72) Inventors: Jiaxin Zhang, Mountain View, CA (US); Kamalika Das, Saratoga, CA (US); Sricharan Kumar, Ann Arbor, MI (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 18/225,086

(22) Filed: Jul. 21, 2023

(51) Int. Cl.
*G06F 16/242* (2019.01)
*G06N 3/084* (2023.01)

(52) U.S. Cl.
CPC ........... *G06F 16/243* (2019.01); *G06N 3/084* (2013.01)

(58) Field of Classification Search
CPC ............................... G06F 16/243; G06N 3/084
See application file for complete search history.

(56) References Cited

U.S. PATENT DOCUMENTS

| | | | |
|---|---|---|---|
| 2011/0066650 A1* | 3/2011 | Fuxman | G06F 16/3349 707/E17.108 |
| 2016/0132572 A1* | 5/2016 | Chang | G06F 16/9024 707/723 |
| 2020/0210502 A1* | 7/2020 | Gan | G06F 16/907 |
| 2021/0248455 A1* | 8/2021 | Reddy | G06N 3/045 |
| 2022/0067037 A1* | 3/2022 | Ranganathan | G10L 15/22 |

OTHER PUBLICATIONS

Tamkin, A., et al, "Task Ambiguity in Humans and Language Models", Dec. 20, 2022, 31 pages.
Kuhn, L., et al., "CLAM: Selective Clarification for Ambiguous Questions with Large Language Models", Dec. 15, 2022, 11 pages.
Guo, M., et al., "Abg-CoQA: Clarifying Ambiguity in Conversational Question Answering", Jan. 1, 2021, 17 pages.
Tamkin, A., et al., "Active Learning Helps Pretrained Models Learn the Intended Task", 36th Conference on Neural Information Processing Systems (NeurIPS 2022), Oct. 31, 2022, 14 pages.

* cited by examiner

*Primary Examiner* — Richard L Bowen
*Assistant Examiner* — Aryan D Toughiry
(74) *Attorney, Agent, or Firm* — Lathrop GPM LLP

(57) ABSTRACT

Disambiguity in large language models (LLMs) includes receiving an original query in a user interface, generating an ambiguity query from the original query, and sending, via an application programming interface (API) of an LLM, the ambiguity query to the LLM. The ambiguity query includes the original query and training the LLM to recognize ambiguities. The method further includes receiving, via the API and responsive to the ambiguity query, a binary response and detecting, based at least in part on the binary response, the original query as ambiguous. Disambiguity may include detecting an ambiguity location in the original query using perturbed queries and the LLM.

10 Claims, 5 Drawing Sheets

DISAMBIGUITY IN LARGE LANGUAGE MODELS

BACKGROUND

Large language models (LLMs) are artificial neural network models that have millions or more parameters and are trained using self-or semi-supervised learning. For example, LLMs may be pre-trained models that are designed to recognize text, summarize the text, and generate content using very large datasets. LLMs are general models rather than specifically trained on a particular task. LLMs are not further trained to perform specific tasks. Because LLMs are general models that operate on human language, LLMs may produce incorrect output. For example, small changes in input to the LLM may cause a major and incorrect change in the response from the LLM.

LLMs may be used as the logic of chat programs that communicate directly with humans. Thus, humans can find information or other content from the LLMs. However, humans submitting input to the LLM may not have the knowledge to recognize when incorrect output is produced. For example, a human interacting with the LLM often do not recognize when a particular phrasing of a query changes the output. Moreover, an LLM, which is trained for general tasks, often cannot detect when its output is incorrect because of the input being ambiguous.

SUMMARY

In general, in one aspect, one or more embodiments relate to a method that includes receiving an original query in a user interface, generating an ambiguity query from the original query, and sending, via an application programming interface (API) of a large language model, the ambiguity query to the large language model. The ambiguity query includes the original query and training the large language model to recognize ambiguities. The method further includes receiving, via the API and responsive to the ambiguity query, a binary response and detecting, based at least in part on the binary response, the original query as ambiguous.

In general, in one aspect, one or more embodiments relate to a method that includes receiving an original query in a user interface, perturbing the original query with multiple separate perturbations to generate perturbed queries, and enclosing the plurality of perturbed queries into at least one ambiguity query. The at least one ambiguity query includes the perturbed queries and training a large language model to recognize ambiguities, and sending, via an application programming interface (API) of the large language model, the at least one ambiguity query to the large language model. The method further includes receiving, via the API and responsive to the at least one ambiguity query, binary responses and corresponding confidence values and detecting, based on the binary responses and the corresponding confidence values, an ambiguous location in the original query.

In general, in one aspect, one or more embodiments relate to a system that includes at least one computer processor, a user interface comprising a query input widget to receive an original query, and a prompt manager executing on the at least one computer processor configured to perform operations. The operations include generating an ambiguity query from the original query, and sending, via an application programming interface (API) of a large language model, the ambiguity query to the large language model. The ambiguity query includes the original query and training the large language model to recognize ambiguities. The method further includes receiving, via the API and responsive to the ambiguity query, a binary response and a confidence value, and detecting, based on the binary response and the confidence value, the original query as ambiguous.

Other aspects of the invention will be apparent from the following description and the appended claims.

BRIEF DESCRIPTION OF DRAWINGS

Like elements in the various figures are denoted by like reference numerals for consistency.

DETAILED DESCRIPTION

In general, embodiments are directed to detecting and potentially correcting ambiguous queries to a large language model (LLM). Specifically, one or more embodiments address the problem of ambiguous queries to the LLM causing incorrect output by performing concurrent, with an original query, training of the LLM to recognize queries that are ambiguous. Specifically, one or more embodiments add a middle tier between the user interface and the LLM that detects ambiguities and request specific clarification when ambiguities are detected.

In one or more embodiments, the original query is initially enclosed in an ambiguity query that includes an instruction to the LLM to respond with a binary output indicating whether the original query is ambiguous. The ambiguity query also trains the LLM to recognize when the original query is ambiguous. The LLM outputs a result indicating if the LLM detects the original query as ambiguous as well as a confidence value in the detection. Based on the result, the middle tier may detect that the original query is ambiguous. If ambiguous, the middle tier may further perturb the original query with several various perturbations and repeat the process to detect the location of the ambiguity. Based on the location, the middle tier populates an interface to request clarification from the user ad generate a revised query. The revised query is then transmitted to the LLM. Because the revised query corrects the ambiguity, the output of the LLM is more likely to be correct.

In the Figures and detailed description, "<" and ">" are placeholders for the particular item identified between the "<" and ">" symbols.

Figure 1:
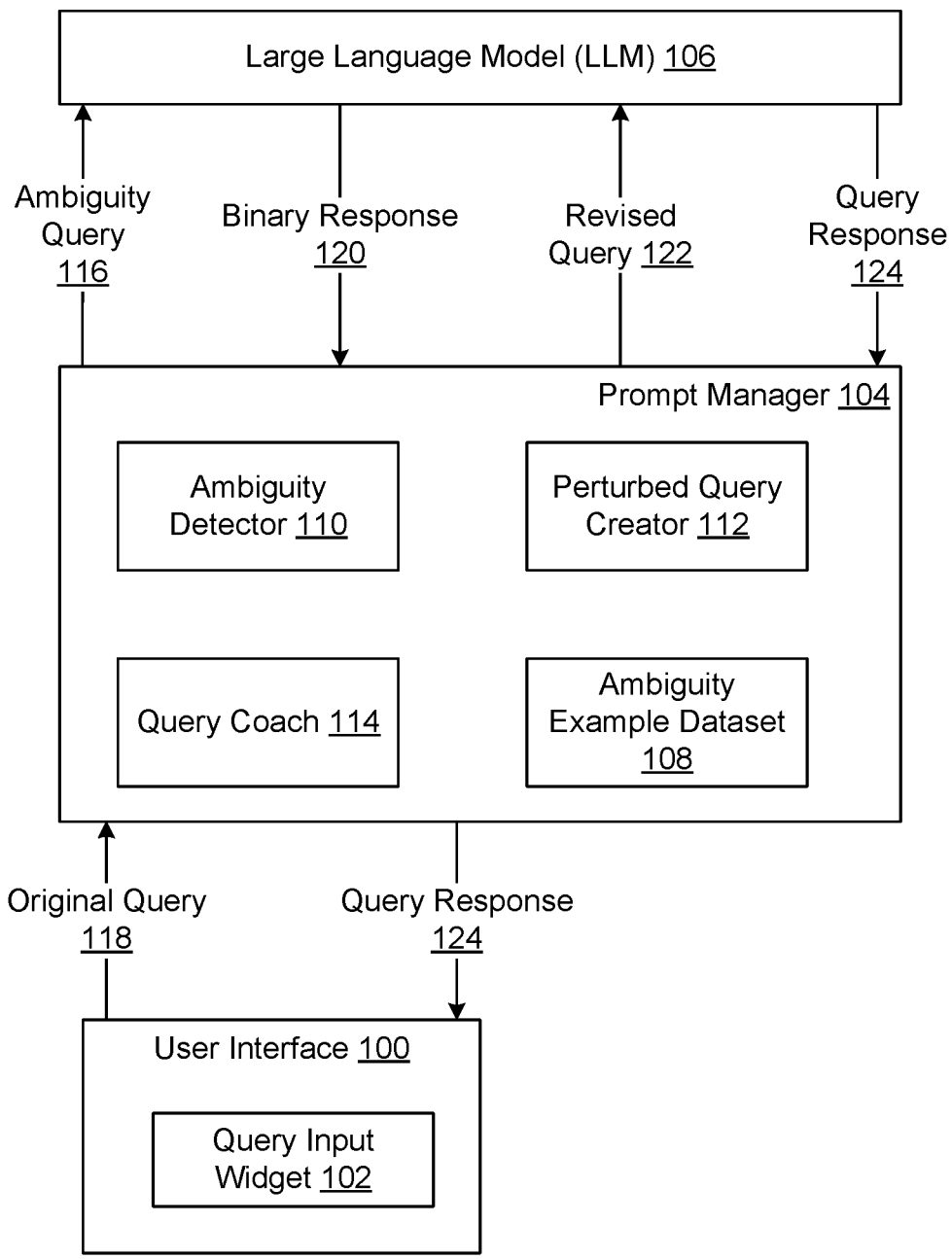
FIG. 1 is a diagram of a system in accordance with one or more embodiments.

Turning to the Figures, FIG. 1 shows a diagram of a system in accordance with one or more embodiments. As shown in FIG. 1, the system includes a user interface (100) with a query input widget (102) connected to a prompt manager (104). The prompt manager (104) is the middle tier between the query input widget (102) and the LLM (106). Each of these components is described below.

The LLM (106) complies with the standard definition used in the art. Specifically, the LLM (106) has millions or more parameters, is generally trained on large quantities of unlabeled text using self-supervised learning or semi-supervised learning. The LLM (106) can understand natural language and generate text and possibly other forms of content. Examples of LLMs include GPT-3® model and GPT-4® model from OpenAI® company, LLaMA from Meta, and PaLM2 from Google®.

A user interface (100) is an interface that communicates with a user. For example, the user interface (100) may be all or a portion of an interface of a program providing specific functionality, a web service, or another type of program. By way of an example, the user interface (100) may be a chat interface or help interface to provide a user with assistance in performing a task. The user interface (100) includes a query input widget (102). The query input widget is one or more graphical user interface widgets that is configured to receive a query from a user. For example, the graphical user interface widget may be a text box or other input widget and one or more prompts to prompt the user to submit the query.

A query is any input, whether or not phrased as a question, that is directed to the LLM (106). An original query (118) is a query that is submitted by the user prior to making revisions to mitigate for ambiguities. The original query (118) may have multiple terms. A term may be a word, phrase, clause, or acronym in the query. Each term has a location in the query. The location is the position of the term with respect to the other terms in the query.

A query may be an ambiguous query or an unambiguous query. An ambiguous query is a query which results in output with different contextual meanings depending on how the query is interpreted or a LLM hallucination (causing the LLM to create factually incorrect or nonsensical output). By way of some examples, the following are ambiguous queries: Did the film come out the last weekend? What is tax return? Why doesn't computer work? Where does <name of world renowned traveler> come from? Whether or not a query is ambiguous has a definitive answer in that more than one possible interpretation of the query causes the query to be ambiguous.

A prompt manager (104) is interposed between the user interface (100) and the LLM (106). The prompt manager (104) is configured to detect an ambiguous query and suggest revisions for the ambiguous query. In one or more embodiments, the prompt manager includes an ambiguity example dataset (108), an ambiguity detector (110), a perturbed query creator (112), and a query coach (114).

The ambiguity example dataset (108) is a set of labeled training data to train the LLM as how to classify an ambiguity. Specifically, the ambiguity example dataset (108) includes labeled queries that include ambiguous and unambiguous queries. Namely, each query in the ambiguity example dataset (108) is related to a label defining whether the query is ambiguous or unambiguous. The same label may be associated with multiple queries in which case the position of the query in the ambiguity example dataset (108) may indicate whether the query is ambiguous or unambiguous. In another example, a separate label may be associated with each query. The ambiguity example dataset (108) may include hundreds or thousands of example ambiguous queries and unambiguous queries. In one or more embodiments, the ambiguity example dataset (108) may be user labeled or derived from user feedback. By way of an example of being human derived, when a user provides feedback that a response to a query did not answer the user's question, then the query that the user submits may be labeled as an ambiguous query.

Continuing with the prompt manager (104), the ambiguity detector (110) is configured to generate an ambiguity query (116) from another query (e.g., the original query (118), and perturbed versions of the original query). The ambiguity query (116) is a query to the LLM that encapsulates another query into a query asking if the other query is an ambiguous query. The ambiguity query (116) may encapsulate the original query (118) or encapsulate perturbed versions of the original query. However, because the LLM (106) is not pretrained to recognize ambiguous queries, the ambiguity query (116) further trains the LLM (106) to recognize ambiguous queries. In one or more embodiments, the training is performed by providing at least a portion of the ambiguity example dataset (108) to the LLM with the ambiguity query. Thus, the ambiguity query may both include an instruction asking whether the other query is an ambiguous query and concurrently train the LLM. For example, the ambiguity query (116) may be an instruction to respond "yes" if the query is whether the other query is an ambiguous query and "no" otherwise.

The ambiguity detector (110) is further configured to receive a binary response (120) from the LLM (106) and detect, based at least in part on the binary response (120). The binary response (120) is the response that has one of two possible values. The first value indicates that the query encapsulated by the ambiguity query is detected as ambiguous by the LLM (106) while the second value indicates that the query encapsulated by the ambiguity query is detected as unambiguous by the LLM (106). The LLM (106) may further be configured to output a confidence value. The confidence value is detected probability that the binary value is correct. Specifically, the confidence value is the degree of confidence that the LLM is correct in predicting the query as ambiguous or unambiguous.

In one or more embodiments, the perturbed query creator (112) is configured to generate perturbed versions of the original query (118). A perturbed version of the original query is referred to as perturbed query. The perturbed query is a version of the original query with one or more terms removed, modified or added. For example, perturbed query may have one or more terms replaced with synonyms, add pronouns, or delete one or more terms of the original query. The modification of the original query that creates the perturbed query is referred to as a perturbation. In one or more embodiments, the perturbation is of one or more complete words of the original query to create the perturbed query. Namely, the perturbation is not merely a misspelling in one or more embodiments.

Continuing with FIG. 1, the prompt manager (104) further includes a query coach (114). The query coach (114) is configured to determine, using the perturbed query creator (112) and the ambiguity detector (110), the locations of the original query that are ambiguous and obtain clarification for the ambiguous query. Specifically, the query coach (114) is configured to obtain a clarification for the original query (118) to generate a revised query (122). The clarification may have more specificity in the original query (118) through adjectives, different word choices, or clauses. In one or more embodiments, the query coach (114) is configured to generate a clarification request for the ambiguous location in the original query. The clarification request is a request to the user to clarify a portion of the original query. For example, the clarification request may be a question or a suggestion to clarify a particular term in the original query that is presented in the user interface (100). For example, the clarification request may be a list of suggestions from which the user may accept one or add the user's own clarification. As another example, the clarification request may be a question presented to the user.

The result of the clarification is a revised query (122) that is transmitted to the LLM (106). The LLM (106) may respond to the revised query (122) with a query response (124), which is presented in the user interface (100). The query response is the answer to the user's query. The query response may be a free-text response. Namely, whereas the ambiguity query is a binary response query in which the result is binary response, the original query and revised query are free-text response queries. The query response may be any text, image, or multimedia response that is the output of the LLM to the revised query.

Communications between the various components may be inter-procedural communications or other forms of communications, such as function calls. For example, the query coach (114) may be the backend of the user interface (100). The query coach (114) may trigger the ambiguity detector (110) and the perturbed query creator (112) to detect whether the original query (118) is ambiguous and, if ambiguous, to detect the ambiguous location in the original query (118). Communications with the LLM (106) may be through the API of the LLM. Specifically, the prompt manager (104) may send calls to the LLM and receive responses via the API of the LLM.

While FIG. 1 shows a configuration of components, other configurations may be used without departing from the scope of the invention. For example, various components may be combined to create a single component. As another example, the functionality performed by a single component may be performed by two or more components. Further, the operations of the various components of FIG. 1 are described in further detail below.

Figure 2:
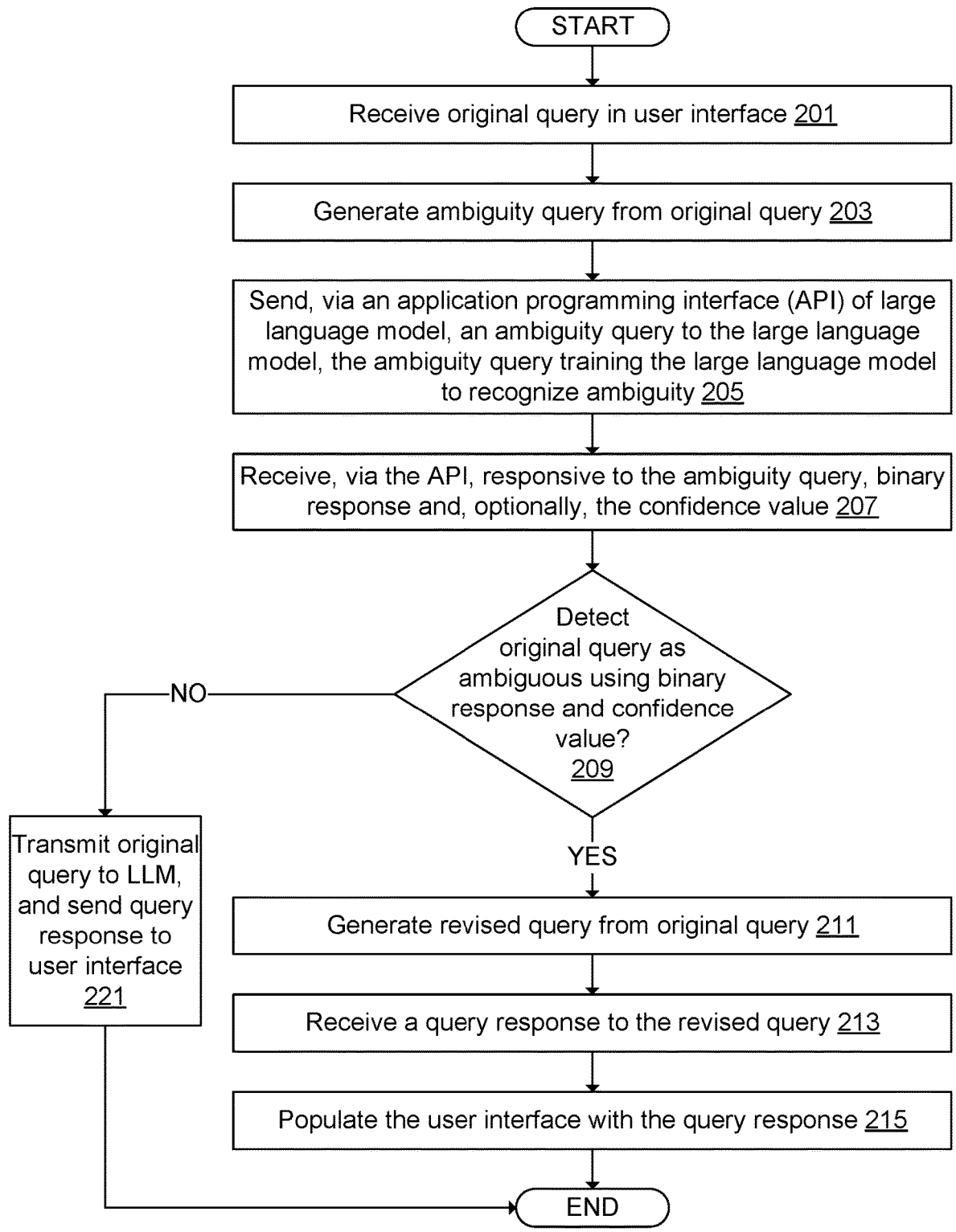
FIG. 2 is a flowchart for detecting ambiguous queries in accordance with one or more embodiments.
Figure 3:
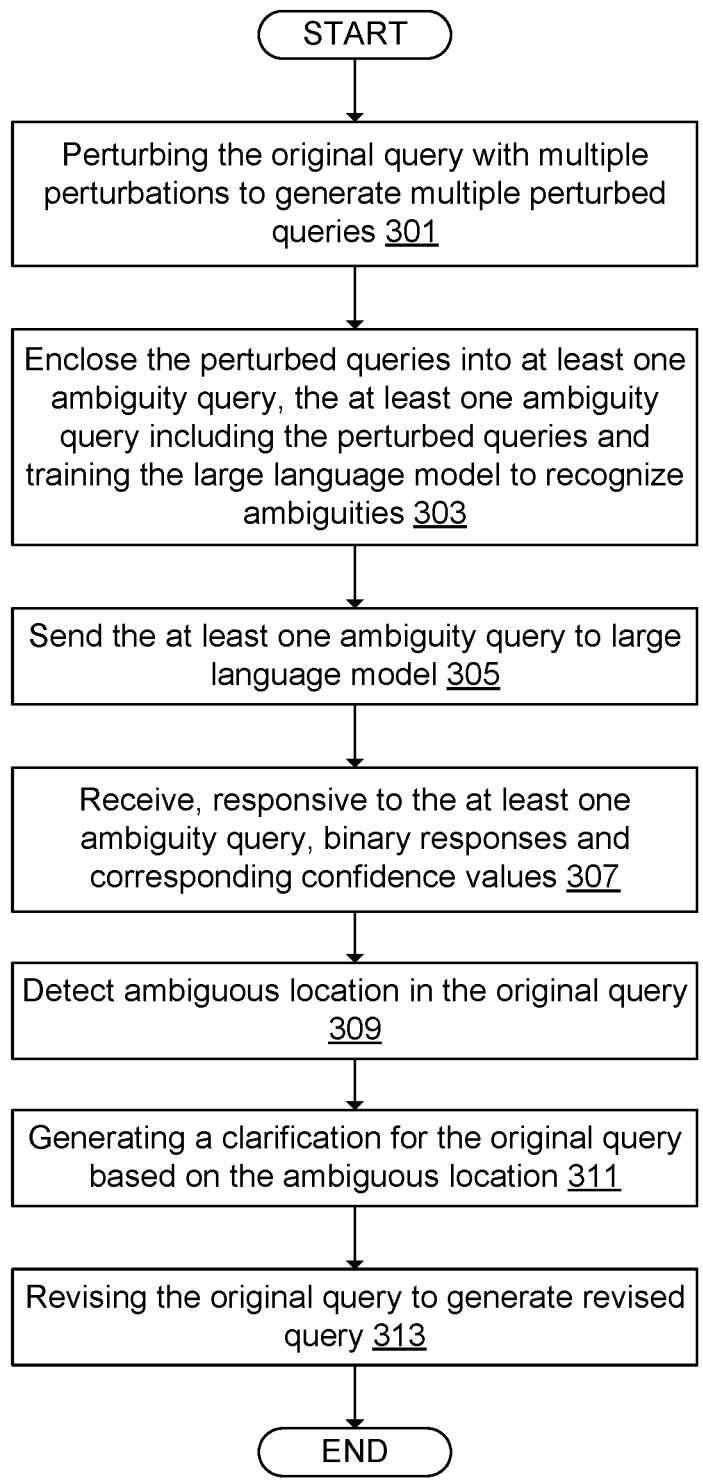
FIG. 3 is a flowchart for revising ambiguous queries in accordance with one or more embodiments.

FIGS. 2 and 3 show flowcharts in accordance with one or more embodiments. While the various steps in these flowcharts are presented and described sequentially, at least some of the steps may be executed in different orders, may be combined or omitted, and at least some of the steps may be executed in parallel. Furthermore, the steps may be performed actively or passively.

Turning to FIG. 2, in Block 201, an original query is received in the user interface. The user interface receives, in the query input widget, a user submission of the query. The user may be unaware of the backend processing of the query. Specifically, to the user, the process of detecting the query is ambiguous and the ambiguous location is hidden. Thus, one or more embodiments add functionality to the computer by programming the computer to detect ambiguous queries and generating more accurate responses to the user.

In Block 203, an ambiguity query is generated from the original query. The ambiguity detector encapsulates the original query into an ambiguity query that is configured to concurrently train the LLM. In one or more embodiments, the ambiguity detector uses a template. The template includes the instruction to the LLM to respond to the ambiguity query with a binary response depending on whether the query added to the template is detected as being ambiguous. The template further includes locations to populate with the ambiguity examples in the ambiguity example dataset. When a template is used, generating the ambiguity query includes populating the template with the original query and at least a portion of the ambiguity examples from the ambiguity example dataset. Other techniques for generating the ambiguity query may be used without departing from the scope of the technology.

In Block 205, via the API of the LLM, the ambiguity query is sent to the LLM whereby the ambiguity query concurrently trains the LLM to recognize ambiguous queries. The prompt manager transmits the ambiguity query to the LLM by sending a request with the ambiguity query using the protocols and request parameters specified by the API of the LLM. As discussed, LLM's are general models that are not specifically trained. Thus, any training of the LLM is concurrent with sending the ambiguity query. The LLM learns the definition of the ambiguity query from the labeled examples transmitted with the ambiguity query. Thus, when the LLM processes the ambiguity query, the LLM both learns the definition of an ambiguous query and evaluates the original query in the ambiguous query to determine whether the ambiguous query is ambiguous.

In Block 207, the prompt manager receives via the API and responsive to the ambiguity query, a binary response and, optionally, a confidence value. Obtaining the binary response and, optionally, confidence value may be performed by transmitting a read request to the API of the LLM and receiving, responsive to the read request, the binary response and confidence value. In particular, the same API may be used regardless of whether the query is an ambiguity query, original query, or revised query to the API. The LLM does not change operations to accommodate the ambiguity query in one or more embodiments. The binary response is the LLM's determination whether the original query is ambiguous. The confidence value may be output by the API of the LLM based on the determination. As another example, the confidence value may be separately determined by the prompt manager. For example, the prompt manager may use an accuracy measure of the LLM to interpolate a confidence value. For example, the prompt manager may request the LLM to provide a confidence value with the binary response.

In Block 209, a determination is whether the prompt manager detects the original query as an ambiguous query using the binary response and confidence value. In some embodiments, the prompt manager uses the binary response directly to detect that the original query is an ambiguous query. Namely, if the binary response is that the original query is ambiguous, then the prompt manager detects the original query as ambiguous. In some embodiments, the prompt manager further uses the confidence value to determine if the original query is ambiguous. For example, if the binary value is that the original query is ambiguous and the confidence value is greater than a minimum threshold, then the prompt manager may detect that the original query is ambiguous. The minimum threshold is a different threshold than a threshold used by the LLM to determine whether the ambiguous query is ambiguous.

For example, the minimum threshold may be less than the threshold used by the LLM. In the example, even though the LLM determines that the original query is ambiguous, the prompt manager may determine that the original query is not ambiguous in order to avoid interrupting the flow with the user.

As another example, the minimum threshold may be greater than the threshold used by the LLM. In the example, even though the LLM determines that the original query is unambiguous, the prompt manager may determine that the original query is ambiguous because further clarification with the user is possible.

If a determination is made that the original query is not ambiguous, then the original query is transmitted to the LLM, and the query response transmitted to the user interface in Block 221. Then, the flow may proceed to end. Transmitting the original query and transmitting the binary response may be via the prompt manager or directly from the user interface to the LLM.

Returning to Block 209, if the original query is detected as ambiguous, the flow proceeds to Block 211. In Block 211, a revised query is generated from the original query. Generating the revised query may be performed by outputting in the user interface, a recommendation to revise the original query and receiving a response with the revised query via the user interface. In some embodiments, generating the revised query may be performed as described in FIG. 3. Regardless of how the revised query is generated, the revised query is transmitted to the LLM. The LLM processes the revised query and replies with the query response that answers the revised query. The query response to the revised query is received in Block 213. In Block 215, the user interface is populated with the query response. The query response is transmitted to the user. Transmitting the revised query and transmitting the query response may be via the prompt manager or directly from the user interface to the LLM. Because the original query is revised to remove ambiguities in order to create the revised query, the corresponding query response is more likely to be accurate than the query response of the original query. Namely, although the original query and the revised query may result in the LLM to responding with the same query response, the revised query is more likely to result in the correct query response while he LLM could misinterpret the original query and provide an inaccurate query response. The correct query response or accurate query response is the query response that matches the intended query of the user.

FIG. 3 shows a flowchart for generating a revised query in accordance with one or more embodiments. Specifically, FIG. 3 may be an expansion of Block 211 of FIG. 2 in accordance with one or more embodiments. In Block 301, the original query is perturbed with multiple perturbations to generate multiple perturbed queries. In one or more embodiments, each perturbation results in a distinct perturbed query. Adding the perturbations may include removing terms of the original query, adding modifiers in front of nouns of the original query, replacing verbs or nouns of the original query with synonyms of the verbs or nouns, and removing terms. For example, in front of nouns, possessive adjectives may be added. Similarly, demonstrative pronouns may be deleted or replaced with other nouns in the query. The perturbations are added at different locations in the query.

In Block 303, the perturbed queries are enclosed into at least one ambiguity query, whereby the at least one ambiguity query includes the perturbed queries and training the large language model to recognize ambiguities. Each perturbed query may be encapsulated into an individual ambiguity query. Encapsulating an individual perturbed query into an ambiguity query may be performed in a same way as encapsulating an original query into an ambiguity query as described above with reference to Block 203 of FIG. 2. In some embodiments, the perturbed queries are added to the same ambiguity query. In such embodiments, the ambiguity query may include instructions to provide an individual binary response for each perturbed query. For example, the ambiguity query for including multiple perturbed queries may be "Examples of ambiguous and unambiguous queries are <ambiguous example dataset>. For each query of the following queries, respond with the query identifier as well as 1 if the query is ambiguous and 0 if the query is unambiguous as exemplified by the examples after the queries: Query id1: <perturbed query>; Query id2: <perturbed query>; . . . ."

In Block 305, the at least one ambiguity query is sent to the LLM. Sending the at least one ambiguity query may be performed as discussed above with reference to Block 205 in FIG. 2. If multiple ambiguity queries are generated, each ambiguity query may be separately sent.

In Block 307, responsive to the at least one ambiguity query, binary responses and corresponding confidence values are received. Receiving binary responses and corresponding confidence values may be performed as discussed above with reference to Block 207 in FIG. 2. If multiple ambiguity queries are sent, then each binary response is associated with the corresponding perturbed query. If a single ambiguity query is sent with multiple perturbed queries, then the prompt manager may unpackage the binary responses and confidence values and associate each binary response and confidence value with the corresponding perturbed query.

In Block 309, one or more ambiguous locations in the original query are detected from the binary responses and confidence values. Detecting a location as an ambiguous location may be performed as follows. For each location of the query, the perturbed queries that have a perturbation at the location is selected. Then, the binary response and confidence value for the selected perturbed queries are compared to the binary response and confidence value for the original query. If the binary response for a selected perturbed query indicates that the perturbed query is unambiguous or if the binary response indicates that the selected perturbed query is still ambiguous but the corresponding confidence value is lower than the confidence value of the original query (indicating that the perturbed query is less likely to be ambiguous), then the location of the perturbation is detected as being an ambiguous location. In other words, if the binary response and confidence value indicates that the selected perturbed query for a location is less likely to be ambiguous, then the location is determined to be an ambiguous location in the original query. Further clarification at the ambiguous location may improve the query. When multiple perturbations are performed for the same location, the binary responses and confidence values may be combined to determine what type of clarification would be helpful.

As discussed above, the process of detecting a location may be repeated for each location in the original query. Multiple ambiguous locations may be determined.

In Block 311, a clarification for the original query is generated based on the ambiguous location. In one of more embodiments, the prompt manager interacts with the user via the user interface to generate the clarification. Specifically, the prompt manager may send a clarification request to the user via the user interface that asks the user to clarify the term. The prompt manager may add some suggestions to clarify the term. For example, the suggestions may be the perturbations that resulted in the query being less ambiguous as compared to the original query. As another example, the suggestions may be the types of perturbations that resulted in the query being less ambiguous (e.g., using a synonym versus adding an adjective or clause).

In order to generate the clarification request, the prompt manager may populate a template with a term at the ambiguous location. The template may be of the form: "What do you mean by "<term at ambiguous location>"? or "Please clarify: "<term at ambiguous location>."

As another example, to generate the clarification request, the LLM may be used. For example, the prompt manager may transmit a request to the LLM asking how the LLM would phrase a question asking to clarify the term at the ambiguous location. The LLM may reply with the clarification request, which is received by the prompt manager and populated in the user interface. Using the LLM to provide the clarification request may be a way to provide a more specific clarification request.

In response to the clarification request, the original query is revised to generate the revised query in Block 313. A clarification is received in the user interface. The clarification may be a revised query or a description of the term at the ambiguous location. If the clarification request is a description of the term, then the description is added to the original query to create the revised query. Various methods may be used to add the description to generate the revised query. For example, the description may replace the term, add to the end, etc. Blocks 309-313 may be performed for one or more of the ambiguous locations. The result is a more specific query than the original query causing a more accurate response from the LLM.

Figure 4:
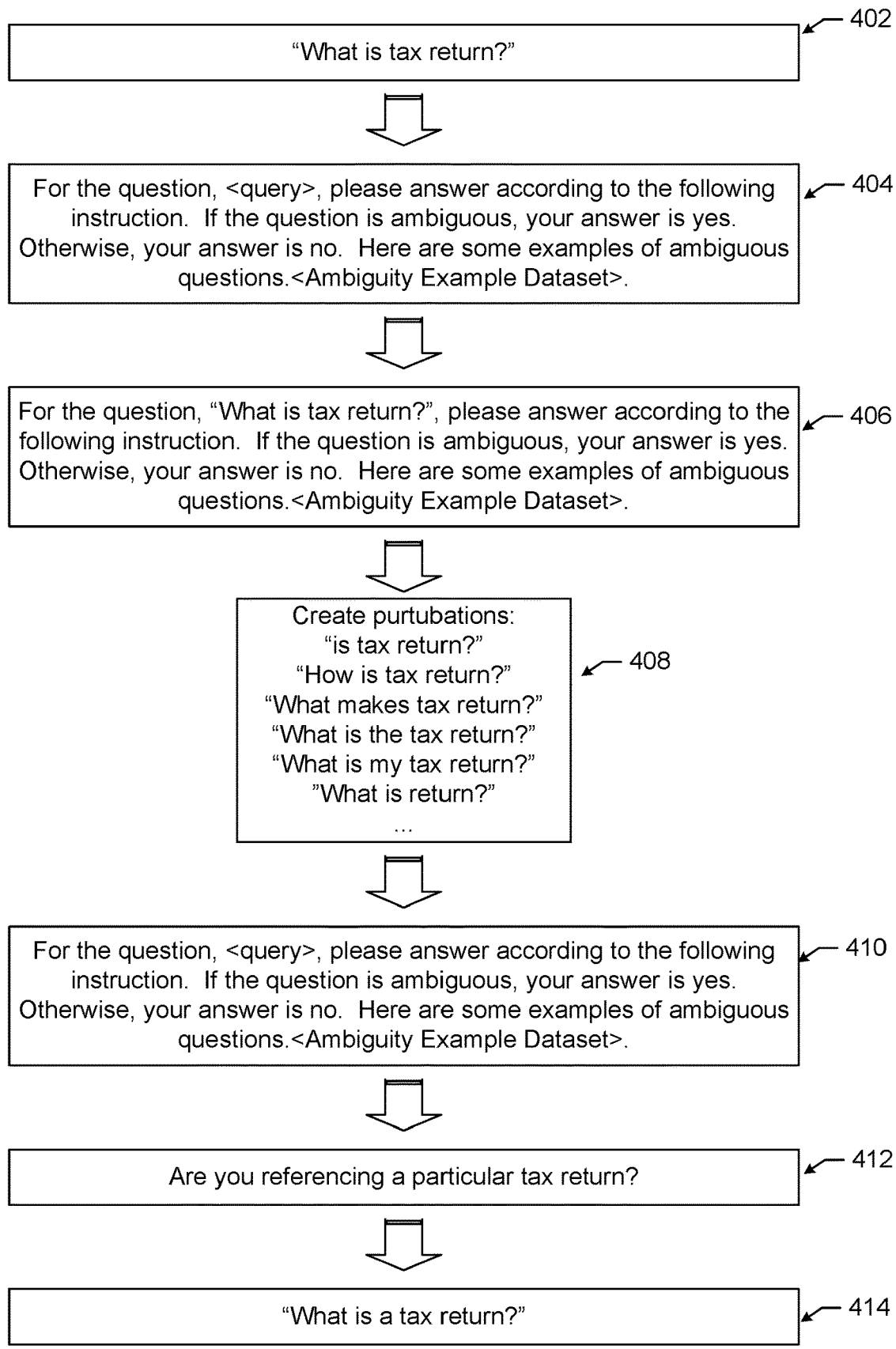
FIG. 4 is an example in accordance with one or more embodiments.

FIG. 4 shows an example in accordance with one or more embodiments. Specifically, FIG. 4 shows a series of blocks illustrating the original query and operations to create the revised query. The example is for explanatory purposes only and not intended to limit the scope of the invention. In the example, a user submits the following original query via the user interface: "What is tax return?" (402). The prompt manager populates an ambiguity template (404) with the original query (402) to create ambiguity query (406). In the example, the ambiguity template (404) may be: "For the question, <query>, please answer according to the following instruction. If the question is ambiguous, your answer is yes. Otherwise, your answer is no. Here are some examples of ambiguous questions.<Ambiguity Example Dataset>." The ambiguity query (406) may be "For the question, "What is tax return?", please answer according to the following instruction. If the question is ambiguous, your answer is yes. Otherwise, your answer is no. Here are some examples of ambiguous questions.<Ambiguity Example Dataset>." Because of the hundreds of examples of ambiguous queries that may be submitted, the ambiguity example dataset is omitted from the example so as to not unnecessarily complicate the description.

Continuing with the example, the ambiguity query is transmitted to the user and the binary response is received. For the purposes of the example, consider the scenario in which the binary response is that the original query is ambiguous with a confidence value of 80% (not shown). Because the ambiguity query is deemed ambiguous, the prompt manager moves from the first stage of detecting the original query as ambiguous to the second stage to create a revised query.

In the second stage, the prompt manager creates multiple perturbations (408) at different locations of the original query. For example, the perturbations (408) may be "is tax return?"; "How is tax return?"; "What makes tax return?"; "What is the tax return?"; "What is my tax return?"; "What is return?"; etc. The perturbations (408) are added to ambiguity template (410). The ambiguity template (410) is the same as the ambiguity template (404) used for the original query in the example. Using the ambiguity query template, multiple perturbed queries are created (e.g., For the question, "What is return?", please answer according to the following instruction. If the question is ambiguous, your answer is yes. Otherwise, your answer is no. Here are some examples of ambiguous questions.<Ambiguity Example Dataset>.).

After receiving the binary responses and confidence values, the prompt manager determines that the perturbed query "What is the tax return?" had a binary response of ambiguous and a confidence value of 65% while the perturbed query "What is my tax return?" had a binary response of unambiguous and a confidence value of 75%. Because 65% and unambiguous are both better results than the original query, the prompt manager determines that the ambiguous location is in front of the word, "tax." The remaining binary responses and confidence values indicated that the perturbed queries were more ambiguous. Thus, the single location is detected as being an ambiguous location.

After detecting the single location, the prompt manager adds the following question to the user interface: "Are you referencing a particular tax return?" (412). In the example, the user replies no in the user interface. Thus, the prompt manager may create the revised query "What is a tax return?" (414) to the LLM. Because the revised query is more specific, the LLM is able to provide a response describing a tax return and answering the user's question. Thus, as shown by the example, the query response is a more accurate response.

Figure 5A:
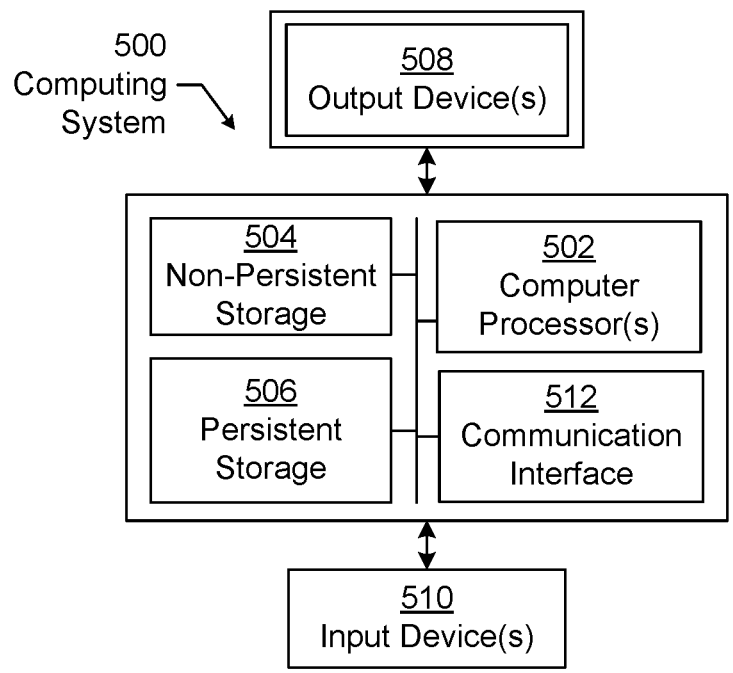
FIGS. 5A and 5B show a computing system in accordance with one or more embodiments of the invention.

Embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 5A, the computing system (500) may include one or more computer processors (502), non-persistent storage (504), persistent storage (506), a communication interface (512) (e.g., Bluetooth interface, infrared interface, network interface, optical interface, etc.), and numerous other elements and functionalities that implement the features and elements of the disclosure. The computer processor(s) (502) may be an integrated circuit for processing instructions. The computer processor(s) may be one or more cores or micro-cores of a processor. The computer processor(s) (502) includes one or more processors. The one or more processors may include a central processing unit (CPU), a graphics processing unit (GPU), a tensor processing units (TPU), combinations thereof, etc.

The input devices (510) may include a touchscreen, keyboard, mouse, microphone, touchpad, electronic pen, or any other type of input device. The input devices (510) may receive inputs from a user that are responsive to data and messages presented by the output devices (508). The inputs may include text input, audio input, video input, etc., which may be processed and transmitted by the computing system (500) in accordance with the disclosure. The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the output devices (508) may include a display device, a printer, external storage, or any other output device. One or more of the output devices may be the same or different from the input device(s). The input and output device(s) may be locally or remotely connected to the computer processor(s) (502). Many different types of computing systems exist, and the aforementioned input and output device(s) may take other forms. The output devices (508) may display data and messages that are transmitted and received by the computing system (500). The data and messages may include text, audio, video, etc., and include the data and messages described above in the other figures of the disclosure.

Software instructions in the form of computer readable program code to perform embodiments may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments, which may include transmitting, receiving, presenting, and displaying data and messages described in the other figures of the disclosure.

Figure 5B:
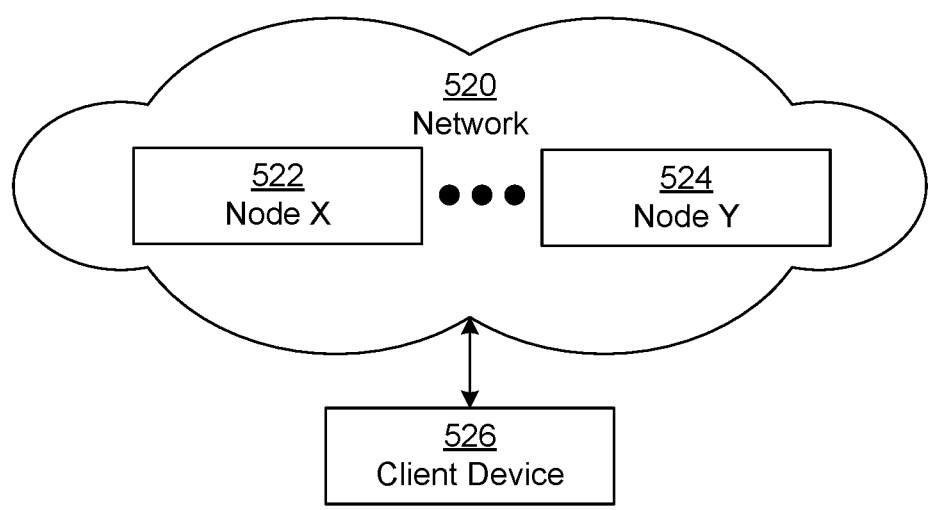

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (500) may be located at a remote location and connected to the other elements over a network.

The nodes (e.g., node X (522), node Y (524)) in the network (520) may be configured to provide services for a client device (526), including receiving requests and transmitting responses to the client device (526). For example, the nodes may be part of a cloud computing system. The client device (526) may be a computing system, such as the computing system shown in FIG. 5A. Further, the client device (526) may include and/or perform all or a portion of one or more embodiments.

The computing system of FIG. 5A may include functionality to present raw and/or processed data, such as results of comparisons and other processing. For example, presenting data may be accomplished through various presenting methods. Specifically, data may be presented by being displayed in a user interface, transmitted to a different computing system, and stored. The user interface may include a GUI that displays information on a display device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

As used herein, the term "connected to" contemplates multiple meanings. A connection may be direct or indirect (e.g., through another component or network). A connection may be wired or wireless. A connection may be temporary, permanent, or semi-permanent communication channel between two entities.

The various descriptions of the figures may be combined and may include or be included within the features described in the other figures of the application. The various elements, systems, components, and steps shown in the figures may be omitted, repeated, combined, and/or altered as shown from the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, unless expressly stated otherwise, or is an "inclusive or" and, as such includes "and." Further, items joined by an or may include any combination of the items with any number of each item unless expressly stated otherwise.

In the above description, numerous specific details are set forth in order to provide a more thorough understanding of the disclosure. However, it will be apparent to one of ordinary skill in the art that the technology may be practiced without these specific details. In other instances, well-known features have not been described in detail to avoid unnecessarily complicating the description. Further, other embodiments not explicitly described above can be devised which do not depart from the scope of the claims as disclosed herein. Accordingly, the scope should be limited only by the attached claims.

What is claimed is:

1. A method comprising:
   receiving an original query in a user interface;
   generating an ambiguity query from the original query;
   sending, via an application programming interface (API) of a large language model, the ambiguity query to the large language model, the ambiguity query comprising the original query and training the large language model to recognize ambiguities,
      wherein training the large language model to recognize ambiguities comprises including, with the original query, an ambiguity example dataset,
      wherein the ambiguity example dataset comprises a plurality of example queries,
      wherein each example query of the plurality of example queries labeled, in the ambiguity query, with a corresponding predefined label indicating whether the example query is ambiguous;
   receiving, via the API and responsive to the ambiguity query, a binary response;
   detecting, based at least in part on the binary response, the original query as ambiguous;
   perturbing, responsive to detecting the original query is ambiguous, the original query with a plurality of distinct perturbations at a plurality of locations in the original query to generate a plurality of perturbed queries;
   sending, via the API, the plurality of perturbed queries to the large language model with a request to identify which of the plurality of perturbed queries are ambiguous;
   receiving, via the API and responsive to the request, a response for a perturbed query in the plurality of perturbed queries;
   detecting, based on the response for the perturbed query and a location of the plurality of locations in the original query that is perturbed to form the perturbed query, the location as an ambiguous location in the original query; and obtaining a clarification of the original query at the ambiguous location to generate a revised query, wherein obtaining the clarification comprises:
transmitting the ambiguous location and a request for a clarification request to the large language model;
receiving the clarification request from the large language model,
populating the user interface with the clarification request for the ambiguous location; and
receiving the clarification responsive to the clarification request.

2. The method of claim 1, further comprising:
generating, responsive to the original query being ambiguous, the revised query;
sending, via the API, the revised query to the large language model;
receiving, via the API, a query response to the revised query; and
populating the user interface with the query response.

3. The method of claim 1, wherein the ambiguity query is a binary response query, and the original query is a free-text response query.

4. The method of claim 1, comprising:
enclosing the plurality of perturbed queries into at least one ambiguity query, the at least one ambiguity query comprising the plurality of perturbed queries and training the large language model to recognize ambiguities, wherein sending the plurality of perturbed queries to the large language model comprises sending the at least one ambiguity query;
receiving, via the API and responsive to the at least one ambiguity query, a plurality of binary responses and corresponding confidence values; and
detecting, based on the plurality of binary responses and the corresponding confidence values, the ambiguous location in the original query.

5. The method of claim 1, wherein perturbing the original query comprises removing a term in the original query.

6. The method of claim 1, wherein perturbing the original query comprises replacing a term in the original query with a synonym.

7. The method of claim 1, further comprising:
detecting a plurality of ambiguous locations in the original query using the large language model, wherein the plurality of ambiguous locations comprises the ambiguous location; and
generating the clarification for at least one of the plurality of ambiguous locations.

8. A method comprising:
receiving an original query in a user interface;
perturbing the original query with a plurality of distinct perturbations at a plurality of locations in the original query to generate a plurality of perturbed queries;
enclosing the plurality of perturbed queries into at least one ambiguity query, the at least one ambiguity query requesting to identify which of the plurality of perturbed queries are ambiguous, the at least one ambiguity query comprising the plurality of perturbed queries and training a large language model to recognize ambiguities,
wherein training the large language model to recognize ambiguities comprises including, with the original query, an ambiguity example dataset,
wherein the ambiguity example dataset comprises a plurality of example queries,
wherein each example query of the plurality of example queries labeled, in the ambiguity query, with a corresponding predefined label indicating whether the example query is ambiguous;
sending, via an application programming interface (API) of the large language model, the at least one ambiguity query to the large language model;
receiving, via the API and responsive to the at least one ambiguity query, a plurality of binary responses and corresponding confidence values, wherein the plurality of binary responses and corresponding confidence values each identify whether a corresponding perturbed query is ambiguous and a confidence level of the ambiguity;
identifying a perturbed query in the plurality of perturbed queries having at least one of a different binary response and a different corresponding confidence value than the original query to obtain an identified perturbed query;
detecting an ambiguous location in the original query based on the ambiguous location being a location of the plurality of locations in the original query that is perturbed to form the identified perturbed query; and
obtaining a clarification of the original query at the ambiguous location to generate a revised query, wherein obtaining the clarification comprises:
transmitting the ambiguous location and a request for a clarification request to the large language model;
receiving the clarification request from the large language model,
populating the user interface with the clarification request for the ambiguous location; and
receiving the clarification responsive to the clarification request.

9. The method of claim 8, wherein perturbing the original query comprises at least one selected from a group consisting of removing a term of the original query and replacing the term in the original query with a synonym.

10. A system comprising:
at least one computer processor;
a user interface comprising a query input widget to receive an original query; and
a prompt manager executing on the at least one computer processor configured to perform operations comprising:
generating an ambiguity query from the original query,
sending, via an application programming interface (API) of a large language model, the ambiguity query to the large language model, the ambiguity query comprising the original query and training the large language model to recognize ambiguities,
wherein training the large language model to recognize ambiguities comprises including, with the original query, an ambiguity example dataset,
wherein the ambiguity example dataset comprises a plurality of example queries, and
wherein each example query of the plurality of example queries labeled, in the ambiguity query, with a corresponding predefined label indicating whether the example query is ambiguous,
receiving, via the API and responsive to the ambiguity query, a binary response and a confidence value,
detecting, based on the binary response and the confidence value, the original query as ambiguous, perturbing, responsive to detecting the original query is ambiguous, the original query with a plurality of distinct perturbations at a plurality of locations in the original query to generate a plurality of perturbed queries, sending, via the API, the plurality of perturbed queries to the large language model with a request to identify which of the plurality of perturbed queries are ambiguous, receiving, via the API and responsive to the request, a response for a perturbed query in the plurality of perturbed queries, detecting, based on the response for the perturbed query and a location of the plurality of locations in the original query that is perturbed to form the perturbed query, the location as an ambiguous location in the original query, and obtaining a clarification of the original query at the ambiguous location to generate a revised query, wherein obtaining the clarification comprises:
  transmitting the ambiguous location and a request for a clarification request to the large language model;
  receiving the clarification request from the large language model,
  populating the user interface with the clarification request for the ambiguous location; and receiving the clarification responsive to the clarification request.

* * * * *